United States Patent
Kawamura et al.

(10) Patent No.: US 8,720,877 B2
(45) Date of Patent: May 13, 2014

(54) OSCILLATION CONTROLLER FOR AN OSCILLATING BODY CAPABLE OF ADJUSTING ACCELERATION THEREOF

(75) Inventors: Hiroyuki Kawamura, Minamitsuru-gun (JP); Satoshi Ikai, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 51 days.

(21) Appl. No.: 13/479,595

(22) Filed: May 24, 2012

(65) Prior Publication Data
US 2012/0299232 A1   Nov. 29, 2012

(30) Foreign Application Priority Data

May 26, 2011 (JP) ................. 2011-117695
Apr. 3, 2012 (JP) ................. 2012-084854

(51) Int. Cl.
*B23Q 3/18* (2006.01)
(52) U.S. Cl.
USPC ............................. 269/58; 269/55
(58) Field of Classification Search
None
See application file for complete search history.

(56) References Cited

U.S. PATENT DOCUMENTS 5,133,158 A * 7/1992 Kihara et al. ............ 451/11
8,518,223 B2 * 8/2013 Mielke ................... 204/229.4

FOREIGN PATENT DOCUMENTS

| JP | 07-244520 | 9/1995 | |
| JP | 2007-279899 | * 4/2006 | .......... G05B 19/416 |
| JP | 2007-279899 | 10/2007 | |
| JP | 2010-262467 | 11/2010 | |
| JP | 2011-44081 | 3/2011 | |

* cited by examiner

Primary Examiner — Lee D Wilson
Assistant Examiner — Shantese McDonald
(74) Attorney, Agent, or Firm — Drinker Biddle & Reath LLP

(57) ABSTRACT

In oscillating an oscillating body, a control unit obtains a load torque due to the gravity acting on a drive motor at least at one angular position defined about an axis of rotation. The control unit calculates a specified maximum acceleration depending upon if the load torque Q is acting in a direction in which it hinders the acceleration or deceleration of the drive motor 15 or is acting in a direction in which it assists the acceleration or deceleration. An acceleration for the oscillating body is set so as not to be greater than the calculated specified maximum acceleration. The control unit adjusts the acceleration of the oscillating body depending upon the load torque of when the oscillating body 13 is accelerating or decelerating.

4 Claims, 9 Drawing Sheets

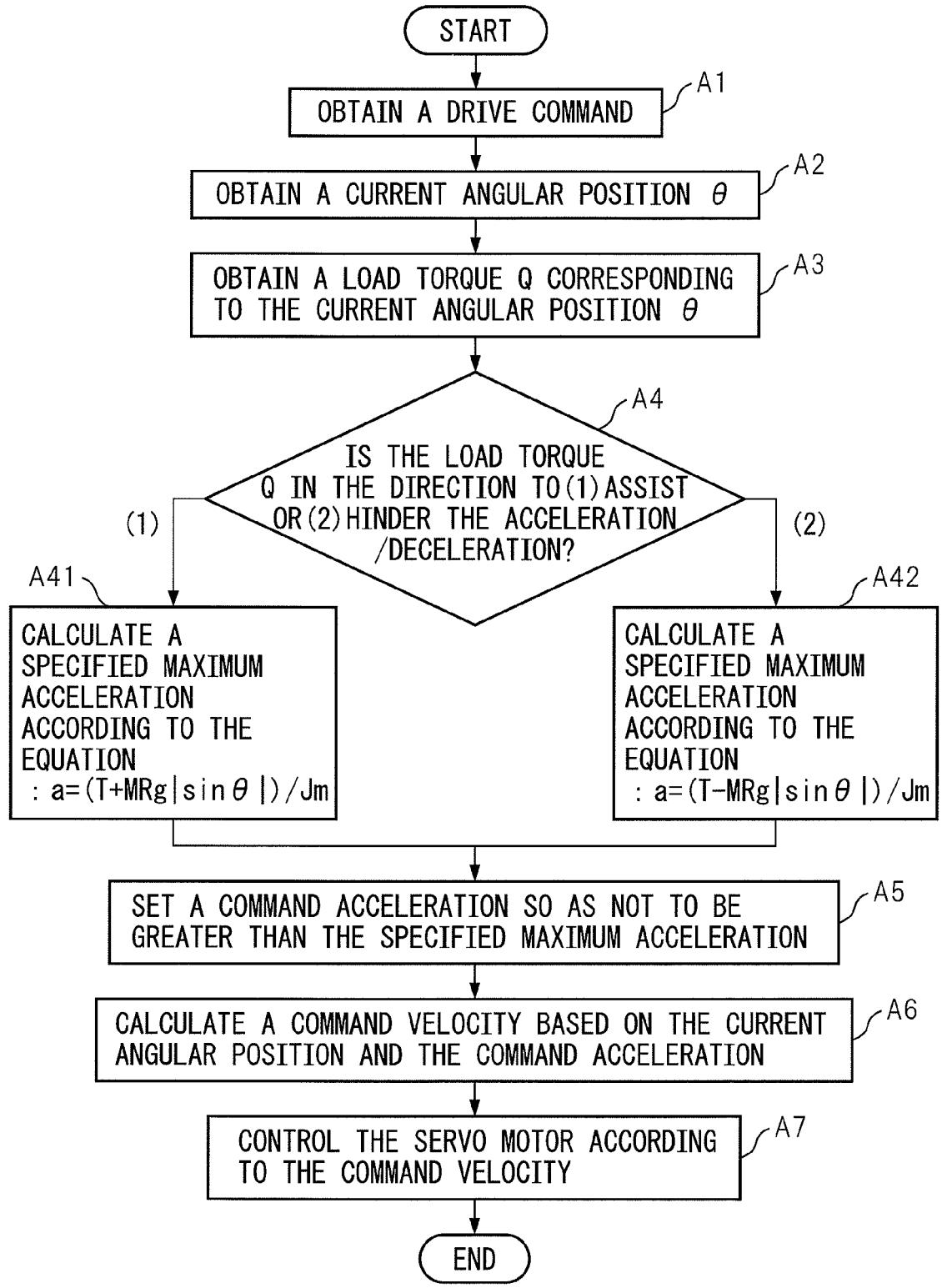

F I G. 9
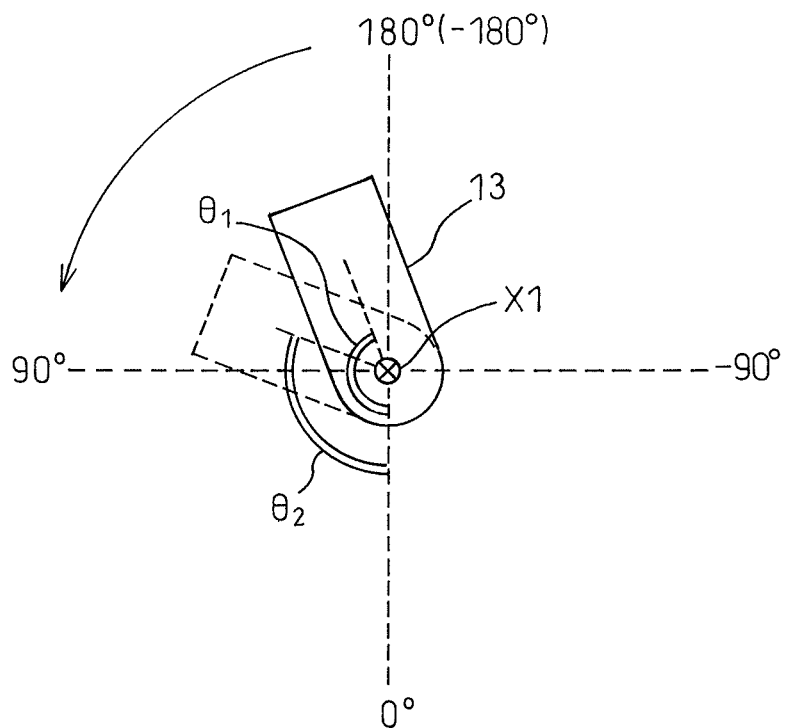

OSCILLATION CONTROLLER FOR AN OSCILLATING BODY CAPABLE OF ADJUSTING ACCELERATION THEREOF

RELATED APPLICATION DATA

This application claims priority under 35 U.S.C. §119 and/or §365 to Japanese Application No. 2011-117695 filed May 26, 2011 and Japanese Application No. 2012-084854 filed Apr. 3, 2012, the entire contents of which are incorporated herein by reference.

BACKGROUND OF THE INVENTION

1. Field of the Invention

This invention relates to an oscillation controller for an oscillating body and, specifically, to an oscillation controller capable of adjusting acceleration of the oscillating body.

2. Description of the Related Art

A machine tool such as a machining center includes an oscillating table for holding a work. The work is tilted due to oscillation of the oscillating table about an axis of rotation that extends, for example, in a horizontal direction. The work is then machined into a desired shape by a tool that moves relative to the work. The oscillating table is oscillated about the axis of rotation by an output torque of a servo motor. Since the center of gravity of the oscillating table is at a predetermined distance from the axis of rotation in a radial direction, a load torque is exerted by action of gravity. The load torque varies, depending upon an angular position of the oscillating table about the axis of rotation. If the load torque acts in a direction in which it hinders the oscillation of the oscillating table, the torque that accelerates or decelerates the oscillating table corresponds to a torque that is a resultant value of the subtraction of the load torque from the output torque of the servo motor. Reference should be made to JP-A-2011-44081 and JP-A-2010-262467.

Currently, the acceleration of the oscillating body when oscillating has been fixed. Specifically, an acceleration of the oscillating body is calculated by subtracting a maximum load torque that hinders the oscillation of the oscillating body from a maximum output torque of a servo motor and further dividing a resultant value of the subtraction by inertia about the axis of rotation. Therefore, at an angular position where the effect of gravity is relatively small, i.e., where the load torque is relatively small, only a lower torque is applied, even though a greater torque can be potentially applied. As a result, a relatively small acceleration is set, and thus, the torque of the servo motor cannot be effectively utilized.

The present invention was conceived in view of the above-mentioned circumstances. Thus, the object of the present invention is to provide an oscillation controller for an oscillating body capable of adjusting the acceleration of the oscillating body when the oscillating body oscillates.

SUMMARY OF THE INVENTION

To achieve the above object according to the present invention, an oscillation controller for an oscillating body, for setting an acceleration of the oscillating body when the oscillating body is oscillated by a drive motor about an axis of rotation that extends in a horizontal direction is provided, wherein a load torque due to gravity acting on the drive motor is obtained at at least one angular position defined about the axis of rotation, if the load torque acts in a direction in which it hinders acceleration or deceleration of the drive motor, a specified maximum acceleration is calculated by subtracting the load torque from an output torque of the drive motor and further dividing a resultant value of the subtraction by inertia about the axis of rotation, if the load torque acts in a direction in which it assists acceleration or deceleration of the drive motor, a specified maximum acceleration is calculated by adding the load torque to an output torque of the drive motor and further dividing a resultant value of the addition by the inertia about the axis of rotation, and an acceleration for the oscillating body at the time of accelerating or decelerating is set so as not to be greater than the calculated specified maximum acceleration.

Further, in the oscillation controller for an oscillating body according to the invention, if the load torque acts in a direction in which it hinders acceleration or deceleration of the drive motor, the specified maximum acceleration is calculated based on a maximum load torque within a range of angles at which the oscillating body is accelerating or decelerating, and if the load torque acts in a direction in which it assists the acceleration or deceleration of the drive motor, the specified maximum acceleration is calculated based on a minimum load torque in a range of angles at which the oscillating body is accelerating or decelerating.

Furthermore, in the oscillation controller for an oscillating body according to the invention, if the oscillating body is accelerating, the specified maximum acceleration is calculated based on an angular position at the start of acceleration of the oscillating body, and if the oscillating body is decelerating, the specified maximum acceleration is calculated based on an angular position at the end of deceleration of the oscillating body.

Furthermore, in the oscillation controller for an oscillating body according to the invention, the specified maximum acceleration is set so as not to be greater than a value that is obtained by dividing the output torque of the drive motor by the inertia.

Furthermore, according to the present invention, there is provided a machine tool comprising:

an oscillating body capable of oscillating about an axis of rotation that extends in a horizontal direction;

a drive motor for oscillating the oscillating body about the axis of rotation; and a control unit for setting an acceleration of the oscillating body at the time of accelerating or decelerating so as not to be greater than a specified maximum acceleration;

wherein the control unit obtains a load torque due to gravity acting on the drive motor at at least one angular position defined about the axis of rotation, if the load torque acts in a direction in which it hinders acceleration or deceleration of the drive motor, the specified maximum acceleration is calculated by subtracting the load torque from an output torque of the drive motor and further dividing a resultant value of the subtraction by inertia about the axis of rotation, if the load torque acts in a direction in which it assists acceleration or deceleration of the drive motor, the specified maximum acceleration is calculated by adding the load torque to an output torque of the drive motor and further dividing a resultant value of the addition by the inertia about the axis of rotation, and an acceleration for the oscillating body at the time of accelerating or decelerating is set so as not to be greater than the calculated specified maximum acceleration.

These and other objects, features and advantages of the invention will become more apparent in light of the detailed description of exemplary embodiments thereof as illustrated in the drawings.

BRIEF DESCRIPTION OF THE DRAWINGS

FIG. 7 is a flowchart illustrating a flow of processing in a control unit according to a first embodiment of the invention;

FIG. 9 is a sectional view schematically illustrating a state where the oscillating table is oscillating, corresponding to FIG. 2;

DETAILED DESCRIPTION

Figure 1:
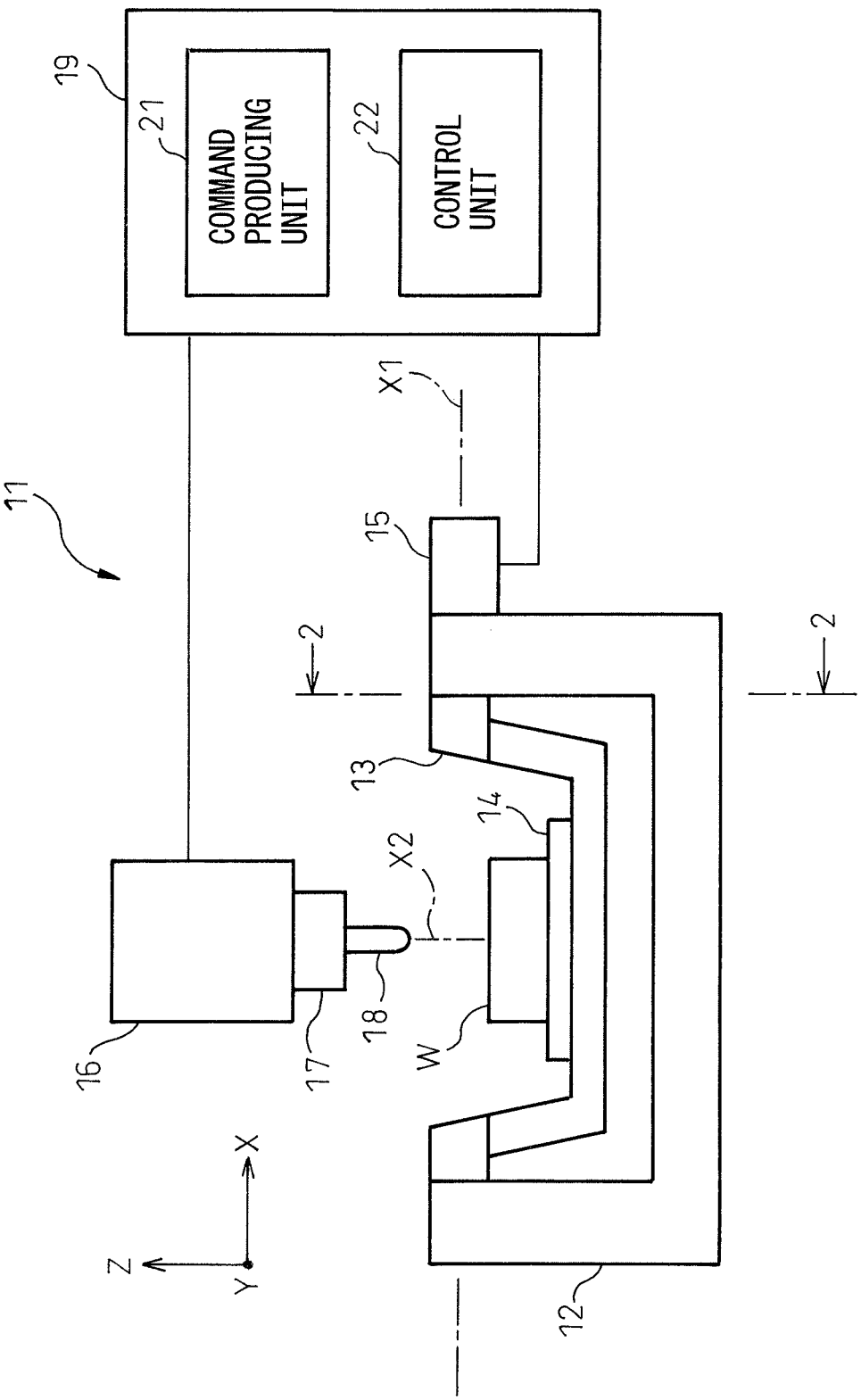
FIG. 1 is a view schematically illustrating a configuration of a machine tool according to one embodiment of the invention.

Embodiments of the invention will now be described with reference to the accompanying drawings. FIG. 1 is a view schematically illustrating a configuration of a machine tool 11 according to one embodiment of the invention. The machine tool 11 constitutes a machining center of, for example, a 5-axis vertical type. XYZ reference coordinate system is set in the machine tool 11.

The machine tool 11 includes a bed 12, an oscillating body, e.g., an oscillating table 13 supported on the bed 12 so as to be able to oscillate about an axis X1 of rotation defined in a horizontal direction in parallel with the X-axis, and a turn table 14 supported on the oscillating table 13 so as to be able to rotate about an axis X2 of rotation defined in a vertical direction in parallel with the Z-axis. A work W is fixed onto the turn table 14. A drive motor, e.g., a servo motor 15 is coupled to the oscillating table 13. The oscillating table 13 is oscillated by rotation of the servo motor 15.

A spindle head 16 is arranged over the oscillating table 13. A tool 18 is detachably attached to the lower end of the spindle head 16 via a spindle 17. The tool 18 is rotated by a spindle motor (not shown) incorporated in the spindle head 16. The tool 18 includes cutting tools such as an end mill, cutter and drill, as well as grinding tools. The spindle head 16 moves in the directions of X-axis, Y-axis and Z-axis via linear feeding mechanisms (not shown) for each of the axes. The linear feeding mechanisms include a ball screw and a servo motor for rotating the ball screw. In this way, a relative movement is realized between the spindle head 16, i.e., the tool 18, and the work W. The tool 18 that rotates during the relative movement comes into contact with the work W at a predetermined machining point. The work W is then machined into a desired shape. A linear motor may be used for the linear feeding mechanisms.

The bed 12 includes an angle detector (not shown) for detecting an angular position of the oscillating table 13 about the axis X1 of rotation. Similarly, the oscillating table 13 includes an angle detector (not shown) for detecting an angular position of the turn table 14. Further, the spindle head 16 includes a plurality of position detectors (not shown) for detecting positions of the spindle head 16 in the X-axis, Y-axis and Z-axis. The positions detected by these position detectors are identified, for example, at the coordinate positions of the reference coordinate system. The detected angular positions and coordinate positions are fed back to an NC (numerical control) device 19. The NC device 19 executes a variety of calculations according to machining programs stored in, for example, a memory unit (not shown). The NC device 19 controls the servo motor and the spindle motor based on the calculations. In the machine tool 11, the oscillating table 13, instead of the spindle head 16, may move in the directions of X-axis, Y-axis and Z-axis.

The NC device 19 includes a command producing unit 21 for producing a drive command according to a machining program and an oscillation controller, i.e., a control unit 22 for outputting a drive signal to the servo motor 15 according to the drive command produced by the command producing unit 21. The drive command includes, for example, an amount of oscillation of the oscillating table 13 about the axis X1 of rotation and a specified oscillating velocity of the oscillating table 13 about the axis X1 of rotation. The amount of oscillation may be specified by an angular position at the start of oscillation and by an angular position at the end of oscillation, or may be specified as an amount of changes in angles from the current angular position that is detected. The specified rotary velocity is set as, for example, a constant velocity V. Like an ordinary control, the servo motor 15 has a position control loop for controlling the angular position, a speed control loop for controlling the angular velocity and an electric current control loop for controlling the acceleration.

Figure 2:
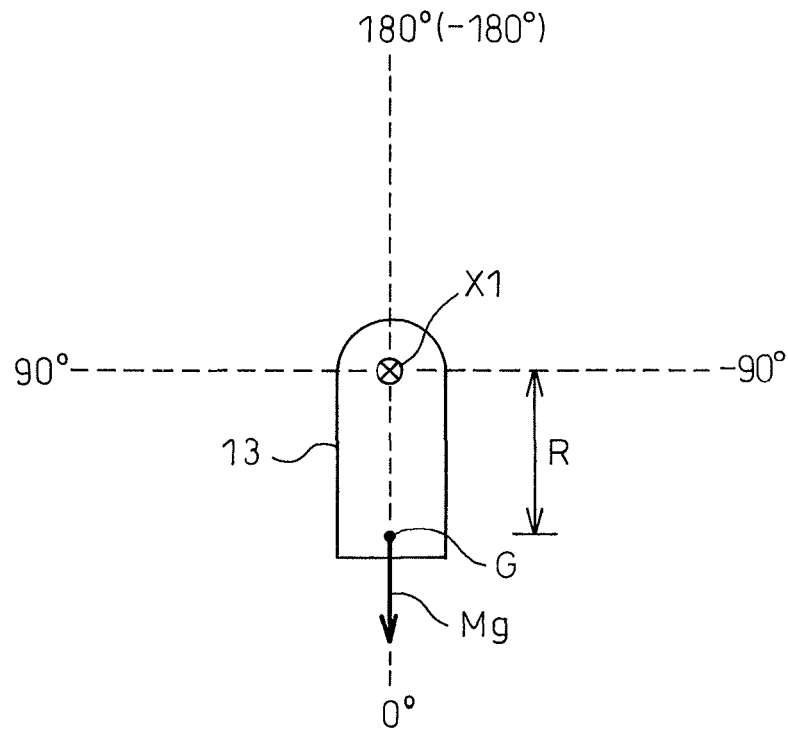
FIG. 2 is a sectional view taken along line 2-2 in FIG. 1.

FIG. 2 is a sectional view taken along the line 2-2 in FIG. 1. As described above, the oscillating table 13 is supported by the bed 12 so as to be able to oscillate about the axis X1 of rotation. The oscillating table 13 extends outward in a direction perpendicular to the axis X1 of rotation. At a position shown in FIG. 2, the oscillating table 13 is in a reference attitude. The oscillating table 13 in the reference attitude is arranged at an angular position of 0°. With the angular position of 0° as a reference, angular positions are defined about the axis X1 of rotation in the directions opposite to each other. Namely, an angular range is defined from the angular position of 0° to an angular position of 180° in the clockwise direction and an angular range is defined from the angular position of 0° to an angular position of −180° in the counterclockwise direction. The oscillating table 13 may oscillate in either direction about the axis X1 of rotation. However, the angular range of oscillation of the oscillating table 13 is set so as not to be greater than 360°. The servo motor 15 is capable of oscillating the oscillating table 13 over a predetermined angular range about the axis X1 of rotation, based upon an output torque T of the servo motor 15.

The center G of gravity of the oscillating table 13 which supports the work W and the turn table 14 is at a predetermined distance R from the axis X1 of rotation. The center G of gravity is defined in the middle between the two ends of the oscillating table 13 in, for example, the X-axis direction. When the oscillating table 13 oscillates about the axis X1 of rotation, a load torque Q about the axis X1 of rotation is generated, due to the action of gravity. As will become obvious from the following description, a magnitude of the load torque Q is specified by a sinusoidal curve which takes a minimum value or zero at angular positions of 0° and 180° (−180°) and takes a maximum value at angular positions of 90° and −90°. The load torque Q will be described later in detail. The output torque T of the servo motor 15 corresponds to a torque which the servo motor 15 produces for oscillating the oscillating table 13. The output torque T will be described later in detail.

Figure 3:
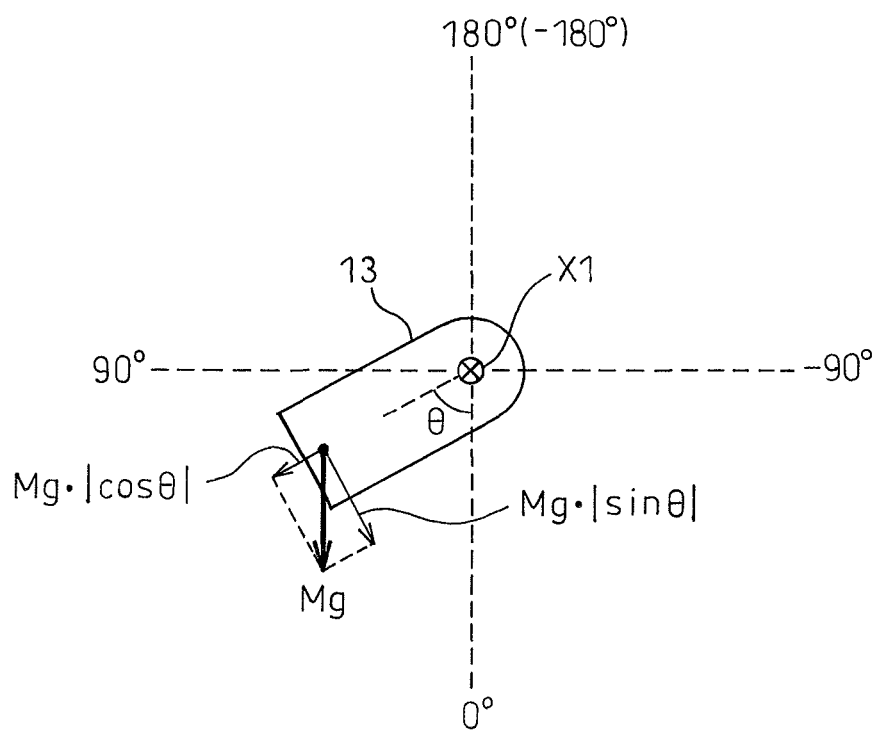
FIG. 3 is a sectional view schematically illustrating a state where an oscillating table is oscillating, corresponding to FIG. 2.

If it is presumed that mass M of the oscillating table 13 concentrates at the center G of gravity, the gravity force Mg is defined at the center G of gravity in the vertical direction. In this context, g represents a gravitational acceleration 9.8 [m/s$^2$]. The load torque Q is zero in the reference attitude as shown in FIG. 2. Referring to FIG. 3, on the other hand, if the oscillating table 13 is arranged at an angular position of a certain angle θ other than 0° or 180° (−180°), then the gravity force Mg can be divided into a tangential component MRg·|sin θ| defined in the tangential direction of an imaginary circle with the axis X1 of rotation as its center and with the distance R as its radius and a normal component MRg·|cos θ| defined in the normal direction. The tangential component MRg·|sin θ| corresponds to the load torque Q for the servo motor 15. In this context, |sin θ| and |cos θ| represent absolute values of sin θ and cos θ, respectively.

Figure 4:
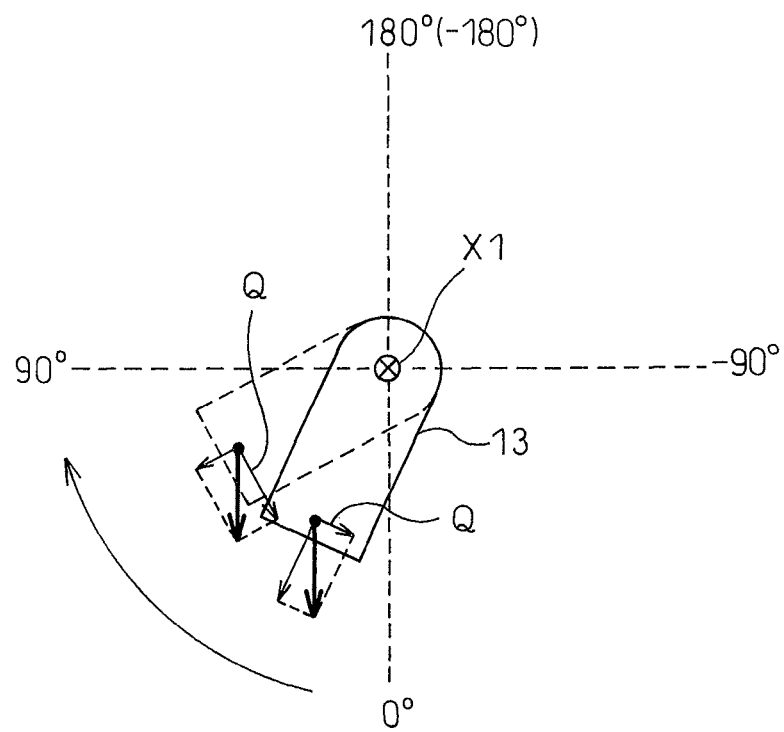
FIG. 4 is a sectional view schematically illustrating a state where the oscillating table is oscillating, corresponding to FIG. 2.

Next, acceleration of the oscillating table 13, specifically a calculation process of the acceleration will be explained. Referring to FIG. 4, assumed here is a case where the oscillating table 13 is accelerated from a certain angular position in a direction in which the angle increases within a range of angular positions of, for example, 0° to 90°. In this case, the load torque Q acts against the direction in which the oscillating table 13 oscillates and, therefore, acts in a direction to hinder the acceleration of the oscillating table 13. As a result, at an angular position of a certain angle θ, a value obtained by subtracting the load torque Q from the output torque T of the servo motor 15 and further by dividing a resultant value of the subtraction by inertia Jm about the axis X1 of rotation corresponds to the acceleration a of the oscillating table 13 at this moment. Namely, the equation:

$$\text{Acceleration } a = (T - MRg \cdot |\sin \theta|)/Jm$$

is derived.

The output torque T of the servo motor 15 is set so as not to be greater than a maximum torque which can be provided by the servo motor 15. For example, in the case where it takes time of 50 ms for the oscillating table 13 to accelerate and reach an angular velocity of 50 revolutions per minute, it requires an angular range of 15° for the acceleration. In this case, the load torque Q varies by up to 26%. The angular range in which the load torque Q varies to the greatest extent is, for example, from 7.5° to −7.5° through an angle of 0°. The servo motor 15 is selected on a condition that a maximum load torque Q is not greater than a continuously rated torque of the servo motor 15 such that the servo motor 15 will not be overheated. In this case, therefore, it is desired that the output torque T used for oscillating the oscillating table 13 is set to a magnitude which is smaller by 26% than the continuously rated torque of the servo motor 15.

Figure 5:
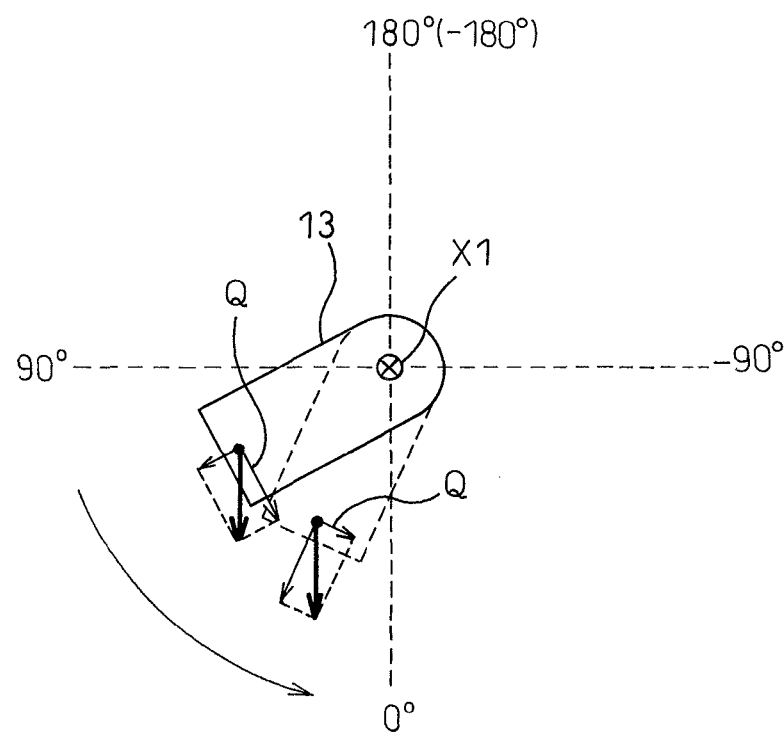
FIG. 5 is a sectional view schematically illustrating a state where the oscillating table is oscillating, corresponding to FIG. 2.

Referring next to FIG. 5, assumed below is a case where the oscillating table 13 is accelerated from a certain angular position in a direction in which the angle decreases within a range of angular positions, for example, from 0° to 90°. In this case, the load torque Q acts in the same direction as the direction in which the oscillating table 13 oscillates and, therefore, acts in a direction to assist the acceleration of the oscillating table 13. As a result, at an angular position of a certain angle θ, a value obtained by adding the load torque Q to the output torque T of the servo motor 15 and further dividing a resultant value of the addition by the inertia Jm about the axis X1 of rotation corresponds to the acceleration a of the oscillating table 13 at this moment. Namely, the equation:

$$\text{Acceleration } a = (T + MRg \cdot |\sin \theta|)/Jm$$

is derived.

The acceleration can also be calculated when the oscillating table 13 decelerates from an angular position of a certain angle θ in a direction in which the angle increases or decreases, in the same manner as described above. Namely, if the load torque Q acts in a direction in which it hinders the deceleration of the oscillating table 13, the equation:

$$\text{Acceleration } a = (T + MRg \cdot |\sin \theta|)/Jm$$

is derived at an angular position of a predetermined angle θ. On the other hand, if the load torque Q acts in a direction in which it assists the deceleration of the oscillating table 13, the equation:

$$\text{Acceleration } a = (T + MRg \cdot |\sin \theta|)/Jm$$

is derived at an angular position of a certain angle θ.

As described above, the calculation formula for calculating the acceleration a differs, depending upon if the load torque Q exerted on the servo motor 15 hinders the acceleration or assists the acceleration. According to the invention, therefore, a specified maximum acceleration which is included in the drive command output from the control unit 22 is calculated by using the above calculation formulas.

Figure 6:
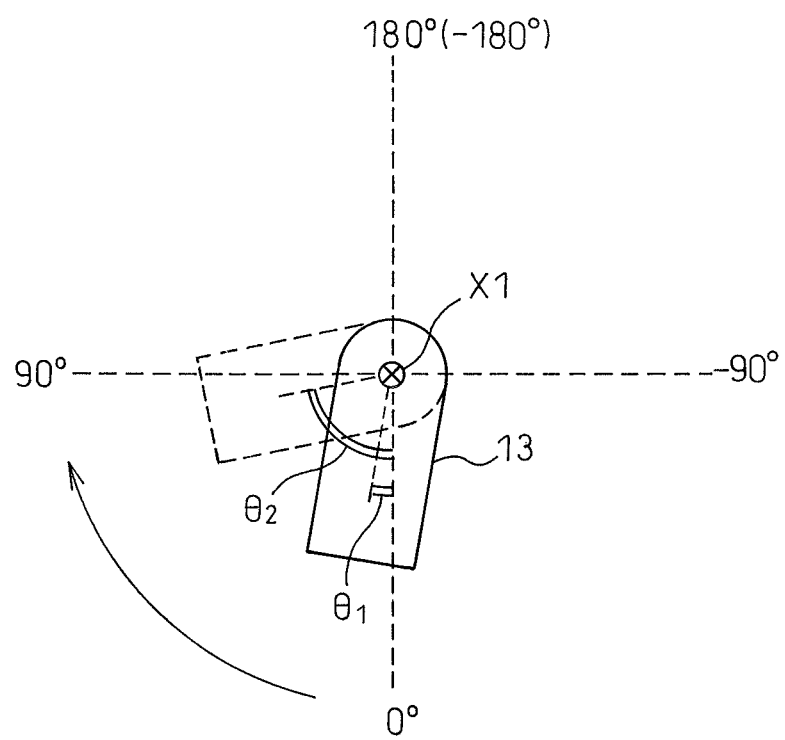
FIG. 6 is a sectional view schematically illustrating a state where the oscillating table is oscillating, corresponding to FIG. 2.

Next, described below with reference to FIG. 7 is a control processing for calculating the specified maximum acceleration. FIG. 7 is a flowchart illustrating a flow of processing in the control unit 22 according to a first embodiment of the invention. First, the control unit 22 obtains a drive command from the command producing unit 21 (step A1). The drive command includes an amount of displacement (defined as an angular range, for example, from angle $\theta_1$ to angle $\theta_2$ (see FIGS. 6 and 9)) of the oscillating table 13 about the axis X1 of rotation, and a velocity V of the oscillating table 13 about the axis X1 of rotation. As a command for indicating the amount of displacement of the oscillating table 13, it may be provided with an amount of displacement from the angular position at the start of command, or with both an angle at the start of command and an angle at the end of command. The control unit 22 then obtains a current angular position θ of the oscillating table 13 as an output of the angle detector (step A2).

The control unit 22 obtains a load torque Q corresponding to the angular position θ (step A3). The load torque Q may be calculated for each control cycle or may be obtained by making a reference to a look-up table which is so associated that a load torque can be referred to from an angular position and which can be read out by the control unit 22.

Next, depending upon the current angular position θ, the control unit 22 determines whether the load torque Q is acting in the direction in which it assists the acceleration or deceleration of the oscillating table 13 or is acting in the direction in which it hinders the acceleration or deceleration (step A4). If the load torque Q is acting in the direction in which it assists the acceleration or deceleration, the control unit 22 calculates a specified maximum acceleration according to the formula:

$$a=(T+MRg\cdot|\sin\theta|)/Jm$$

as described above (step A41). Further, if the load torque Q is acting in the direction in which it hinders the acceleration or deceleration, the control unit 22 calculates a specified maximum acceleration according to the formula:

$$a=(T+MRg\cdot|\sin\theta|)/Jm$$

as described above (step A42).

The specified maximum acceleration thus calculated is used as a specified upper limit value of the command acceleration. Therefore, the control unit 22 sets a command acceleration within a range, so as not to greater than the specified maximum acceleration (step A5). The control unit 22 then calculates a command velocity used in the current control cycle, based on the current angular position θ and the command acceleration set at step A5 (step A6). The servo motor 15 is driven according to the command velocity calculated by the control unit 22 (step A7).

In the first embodiment described above, an optimum specified maximum acceleration is determined for every control cycle by taking into account the action of the load torque Q that varies, depending upon the angular position. Therefore, the torque of the servo motor 15 can be more effectively utilized than the prior art in which the acceleration is set so as to be constant at the time of acceleration and deceleration. In other words, according to this embodiment, the oscillating table 13 is driven with an acceleration equal to or greater than the acceleration in the case of the prior art, and the time required for oscillating the oscillating table 13 can be shortened.

Next, described below is a second embodiment of the invention. In adjusting the acceleration a in the circumferential direction as described later, in the machine tool 11 according to the second embodiment, accelerations are calculated over an angular range from $\theta_S$ to $\theta_E$. $\theta_S$ represents an angular position at the start of acceleration or deceleration, and $\theta_E$ represents an angular position at the end of acceleration or deceleration. Then, based on a range of the accelerations corresponding to the angular range from $\theta_S$ to $\theta_E$, a specified maximum acceleration is determined. For calculation of the accelerations, the following conditions are assumed in relation to the angular positions $\theta_S$ and $\theta_E$, for example. The same conditions can also be set symmetrically in relation to the segment connecting angles of 0° and 180° (−180°), but are not explained to avoid a duplicated description.

The following conditions (1) to (10) will be considered herein:
(1) $0°\le\theta_S<\theta_E\le 90°$;
(2) $0°\le\theta_E<\theta_S\le 90°$;
(3) $90°\le\theta_S<\theta_E\le 180°$;
(4) $90°\le\theta_E<\theta_S\le 180°$;
(5) $0°\le\theta_S\le 90°\le\theta_E\le 180°$, and $\theta_S<\theta_E$;
(6) $0°\le\theta_E\le 90°\le\theta_S\le 180°$, and $\theta_E<\theta_S$;
(7) $-90°\le\theta_S\le 0°\le\theta_E\le 90°$, and $\theta_S<\theta_E$;
(8) $-90°\le\theta_S\le 0°$, and $90°\le\theta_E\le 180°$;
(9) $-180°\le\theta_S\le -90°$, and $0°\le\theta_E\le 90°$; and
(10) $-180°\le\theta_S\le -90°$, and $90°\le\theta_E\le 180°$.
(1) The condition: $0°\le\theta_S<\theta_E\le 90°$ In this angular range, the range in which the load torque can take is expressed by the following inequation:

$$MRg\cdot|\sin\theta_S|\le Q\le MRg\cdot|\sin\theta_E|.$$

In this angular range, the load torque Q acts in the direction in which it hinders the acceleration if the oscillating table 13 is accelerating. Therefore, the range of the accelerations a corresponding to the range of the load torques Q is expressed by the following inequation:

$$(T-MRg\cdot|\sin\theta_E|)/Jm\le a\le(T-MRg\cdot|\sin\theta_S|)/Jm.$$

In this embodiment, a minimum value in the range of the accelerations a is set as a specified maximum acceleration. Namely, the specified maximum acceleration at the time of acceleration is $$a_{max}=(T-MRg\cdot|\sin\theta_E|)/Jm.$$

The angular position $\theta_E$ at the end of acceleration is calculated according to a relation that is satisfied when the oscillating table 13 accelerates with the specified maximum acceleration $a_{max}$ up to the command velocity V.

As described earlier, the velocity V, i.e., an angular velocity of the oscillating table 13 about the axis X1 of rotation is set so as to be constant. Therefore, if the oscillating table 13 accelerates from a certain angle $\theta_S$ toward an angle $\theta_E$ ($\theta_S<\theta_E$) (e.g., condition (1)), the load torque Q acts in the direction in which it hinders the acceleration of the oscillating table 13 and, therefore, the angular velocity V is calculated by integrating the acceleration as expressed by the following numerical formula:

$$V=\int_{\theta S}^{\theta_E}((T-MRg\cdot|\sin\theta_E|)/Jm)d\theta$$

Namely, velocity V is expressed as follows:

$$\text{Velocity } V=((T-MRg\cdot|\sin\theta_E|)/Jm)\times(\theta_E-\theta_S).$$

$\theta_E$ is calculated by solving the above equation. For instance, $\theta_E$ is calculated by substituting for $\theta_E$ values that gradually increases from $\theta_S$ until the equation is satisfied.

Next, described below is how to calculate a specified maximum acceleration at the time of deceleration in the angular range of (1).

In this angular range, the load torque Q acts in the direction in which it assists the deceleration if the oscillating table 13 is decelerating. Therefore, the range of the accelerations a corresponding to the range of the load torque Q is expressed by the following inequation:

$$(T+MRg\cdot|\sin\theta_S|)/Jm\le a\le(T+MRg\cdot|\sin\theta_E|)/Jm.$$

A specified maximum acceleration $a_{max}$ at the time of deceleration is a minimum value in the range of the accelerations a like the above-mentioned specified maximum acceleration $a_{max}$ at the time of acceleration, i.e., $$a_{max}=(T+MRg\cdot|\sin\theta_S|)/Jm.$$

The angular position $\theta_S$ at the start of deceleration is calculated according to the following relation that is satisfied when the oscillating table decelerates with the acceleration $a_{max}$ from the command velocity V to velocity of zero:

$$V=((T+MRg\cdot|\sin\theta_S|)/Jm)\times(\theta_E-\theta_S).$$

Here, $\theta_S$ is calculated by, for example, substituting for $\theta_S$ values that gradually decrease from $\theta_E$ until the equation is satisfied.

(2) The condition: $0°\le\theta_E<\theta_S\le 90°$

In this angular range, the range in which the load torque could take is expressed by the following inequation:

$$MRg\cdot|\sin\theta_E|\le Q\le MRg\cdot|\sin\theta_S|.$$

In this angular range, the load torque Q acts in the direction in which it assists the acceleration if the oscillating table 13 is accelerating. Therefore, the range of the accelerations a corresponding to the range of the load torques Q is expressed by the following inequation:

$$(T+MRg\cdot|\sin\theta_E|)/Jm \leq a \leq (T+MRg\cdot|\sin\theta_S|)/Jm.$$

In this embodiment, a minimum value in the range of the acceleration a is set as a specified maximum acceleration and thus, the specified maximum acceleration $a_{max}$ at the time of acceleration is $$a_{max}=(T+MRg\cdot|\sin\theta_E|)/Jm.$$

The angular position $\theta_E$ at the end of acceleration is calculated according to the following relation that is satisfied when the oscillating table accelerates with the specified maximum acceleration $a_{max}$ up to the command velocity V:

$$V=((T+MRg\cdot|\sin\theta_E|)/Jm)\times(\theta_S-\theta_E).$$

$\theta_E$ is calculated by substituting for $\theta_E$, for example, values that gradually decrease from $\theta_S$ until the equation is satisfied.

In this angular range, the load torque Q acts in the direction in which it hinders the deceleration if the oscillating table 13 is decelerating. Therefore, the range of the accelerations a corresponding to the range of the load torques Q is expressed by the following inequation:

$$(T-MRg\cdot|\sin\theta_S|)/Jm \leq a \leq (T-MRg\cdot|\sin\theta_E|)/Jm.$$

A specified maximum acceleration $a_{max}$ at the time of deceleration is a minimum value in the range of the accelerations a like the above-mentioned specified maximum acceleration $a_{max}$ at the time of acceleration, i.e., $$a_{max}=(T-MRg\cdot|\sin\theta_S|)/Jm.$$

The angular position $\theta_S$ at the start of deceleration is calculated according to the following relation that is satisfied when the oscillating table 13 decelerates with the specified maximum acceleration $a_{max}$ from the command velocity V to velocity of zero:

$$V=((T-MRg\cdot|\sin\theta_S|)/Jm)\times(\theta_S-\theta_E).$$

$\theta_S$ is calculated by substituting, for example, for $\theta_S$ values that gradually decrease from $\theta_E$ until the equation is satisfied.

(3) The condition: $90° \leq \theta_S < \theta_E \leq 180°$

In this angular range, the range in which the load torque could take is expressed by the following inequation:

$$MRg\cdot|\sin\theta_E| \leq Q \leq MRg\cdot|\sin\theta_S|.$$

In this angular range, the load torque Q acts in the direction in which it hinders the acceleration if the oscillating table 13 is accelerating. Therefore, the range of the accelerations a corresponding to the range of the load torques Q is expressed by the following inequation:

$$(T-MRg\cdot|\sin\theta_S|)/Jm \leq a \leq (T-MRg\cdot|\sin\theta_E|)/Jm.$$

In this embodiment, a minimum value in the range of the accelerations a is set as a specified maximum acceleration and, hence, a specified maximum acceleration $a_{max}$ at the time of acceleration is $$a_{max}=(T-MRg\cdot|\sin\theta_S|)/Jm.$$

The angular position $\theta_S$ at the start of acceleration is the angular position at the start of command.

In this angular range, the load torque Q acts in the direction in which it assists the deceleration if the oscillating table 13 is decelerating. Therefore, the range of the accelerations a corresponding to the range of the load torques Q is expressed by the following inequation:

$$(T+MRg\cdot|\sin\theta_E|)/Jm \leq a \leq (T+MRg\cdot|\sin\theta_S|)/Jm.$$

A specified maximum acceleration $a_{max}$ at the time of deceleration is a minimum value in the range of the accelerations a like the above-mentioned specified maximum acceleration $a_{max}$ at the time of acceleration, i.e., $$a_{max}=(T+MRg\cdot|\sin\theta_E\theta|)/Jm.$$

The angular position $\theta_E$ at the end of deceleration is the angular position at the end of command.

(4) The condition: $90° \leq \theta_E < \theta_S \leq 180°$

In this angular range, the range in which the load torque could take is expressed by the following inequation:

$$MRg\cdot|\sin\theta_S| \leq Q \leq MRg\cdot|\sin\theta_E|.$$

In this angular range, the load torque Q acts in the direction in which it assists the acceleration if the oscillating table 13 is accelerating. Therefore, the range of the accelerations a corresponding to the range of the load torqued Q is expressed by the following inequation:

$$(T+MRg\cdot|\sin\theta_S|)/Jm \leq a \leq (T+MRg\cdot|\sin\theta_E|)/Jm.$$

In this embodiment, a minimum value in the range of the accelerations a is set as a specified maximum acceleration and, hence, a specified maximum acceleration $a_{max}$ at the time of acceleration is $$a_{max}=(T+MRg\cdot|\sin\theta_S|)/Jm.$$

The angular position $\theta_S$ at the start of acceleration is the angular position at the start of command.

In this angular range, the load torque Q acts in the direction in which it hinders the deceleration if the oscillating table 13 is decelerating. Therefore, the range of the accelerations a corresponding to the range of the load torques Q is expressed by the following inequation:

$$(T-MRg\cdot|\sin\theta_E|)/Jm \leq a \leq (T-MRg\cdot|\sin\theta_S|)/Jm.$$

A specified maximum acceleration $a_{max}$ at the time of deceleration is a minimum value in the range of the accelerations a like the above-mentioned specified maximum acceleration $a_{max}$ at the time of acceleration, i.e., $$a_{max}=(T-MRg\cdot|\sin\theta_E|)/Jm.$$

The angular position $\theta_E$ at the end of deceleration is the angular position at the end of command.

(5) The condition: $0° \leq \theta_S \leq 90° \leq \theta_E 180°$ and $\theta_S < \theta_E$ In this angular range, the range in which the load torque could take is expressed by the following inequation:

$$MRg\cdot|\sin\theta_S| \leq Q \leq MRg \text{ (where } |\theta_E-90°| \leq |\theta_S-90°|),$$

or $$MRg\cdot|\sin\theta_E| \leq Q \leq MRg \text{ (where } |\theta_S-90°| < |\theta_E-90°|).$$

In this angular range, the load torque Q acts in the direction in which it hinders the acceleration if the oscillating table 13 is accelerating. Therefore, the range of the accelerations a corresponding to the range of the load torques Q is expressed by the following inequation:

$$(T-MRg)/Jm \leq a \leq (T-MRg\cdot|\sin\theta_S|)/Jm \text{ (where } \theta_E-90°| \leq |\theta_S-90°|), \text{ or}$$

$$(T-MRg)/Jm \leq a \leq (T-MRg\cdot|\sin\theta_E|)/Jm \text{ (where } |\theta_S-90°| < |\theta_E-90°|).$$

In this embodiment, a minimum value in the range of the accelerations a is set as a specified maximum acceleration and, hence, a specified maximum acceleration $a_{max}$ at the time of acceleration is $$a_{max}=(T-MRg)/Jm.$$

In this angular range, the load torque Q acts in the direction in which it assists the deceleration if the oscillating table 13 is decelerating. Therefore, the range of the accelerations a corresponding to the range of the load torques Q is expressed by the following inequation:

$$(T+MRg\cdot|\sin\theta_S|)/Jm \leq a \leq (T+MRg)/Jm \text{ (where } |\theta_E-90°| \leq |\theta_S-90°|\text{), or}$$

$$(T+MRg\cdot|\sin\theta_E|)/Jm \leq a \leq (T+MRg)/Jm \text{ (where } |\theta_S-90°| < |\theta_E-90°|\text{)}$$

A specified maximum acceleration $a_{max}$ at the time of deceleration is a minimum value in the range of the accelerations a like the above-mentioned specified maximum acceleration $a_{max}$ at the time of acceleration.

Therefore, if $|\theta_E-90°| \leq |\theta_S-90°|$ is satisfied, $$a_{max}=(T+MRg\cdot|\sin\theta_{Ss}|)/Jm,$$

and if $|\theta_S-90°| < |\theta_E-90°|$ is satisfied, then, $$a_{max}=(T+MRg\cdot|\sin\theta_E|)/Jm$$

The angular position $\theta_S$ at the start of deceleration is calculated according to the following relation that is satisfied when the oscillating table 13 decelerates with the specified maximum acceleration $a_{max}$ from the command velocity V to velocity of zero:

$$V=((T+MRg\cdot|\sin\theta_E|)/Jm)\times(\theta_E-\theta_S).$$

$\theta_S$ is calculated by substituting, for example, for $\theta_S$ values that gradually decrease from $\theta_E$ until the equation is satisfied.

(6) The condition: $0° \leq \theta_E \leq 90° \leq \theta_S \leq 180°$ and $\theta_E < \theta_S$ In this angular range, the range in which the load torque could take is expressed by the following inequation:

$$MRg\cdot|\sin\theta_S| \leq Q \leq MRg \text{ (where } |\theta_E-90°| \leq |\theta_S-90°|\text{),}$$

or $$MRg\cdot|\sin\theta_E| \leq Q \leq MRg \text{ (where } |\theta_S-90°| < |\theta_E-90°|\text{).}$$

In this angular range, the load torque Q acts in the direction in which it assists the acceleration if the oscillating table 13 is accelerating. Therefore, the range of the accelerations a corresponding to the range of the load torques Q is expressed by the following inequation:

$$(T+MRg\cdot|\sin\theta_S|)/Jm \leq a \leq (T+MRg)/Jm \text{ (where } |\theta_E-90°| \leq |\theta_S-90°|\text{), or}$$

$$(T+MRg\cdot|\sin\theta_E|)/Jm \leq a \leq (T+MRg)/Jm \text{ (where } |\theta_S-90°| < |\theta_E-90°|\text{).}$$

In this embodiment, a minimum value in the range of the accelerations a is set as a specified maximum acceleration and, hence, a specified maximum acceleration $a_{max}$ at the time of acceleration is, if $|\theta_E-90°| \leq |\theta_S-90°|$ is satisfied, $$a_{max}=(T+MRg\cdot|\sin\theta_S|)/Jm,$$

and if $|\theta_S-90°| < |\theta_E-90°|$ is satisfied, $$a_{max}=(T+MRg\cdot|\sin\theta_E|)/Jm.$$

The angular position $\theta_E$ at the end of acceleration is calculated according to the following relation that is satisfied when the oscillating table accelerates with the specified maximum acceleration $a_{max}$ up to the command velocity V:

$$V=((T+MRg\cdot|\sin\theta_S|)/Jm)\times(\theta_S-\theta_E) \text{ (where } |\theta_E-90°| \leq |\theta_S-90°|\text{), or}$$

$$V=((T+MRg\cdot|\sin\theta_E|)/Jm)\times(\theta_S-\theta_E) \text{ (where } |\theta_S-90°| < |\theta_E-90°|\text{).}$$

$\theta_E$ is calculated by substituting, for example, for $\theta_E$ values that gradually decrease from $\theta_S$ until the equation is satisfied.

In this angular range, the load torque Q acts in the direction in which it hinders the deceleration if the oscillating table 13 is decelerating. Therefore, the range of the accelerations a corresponding to the range of the load torques Q is expressed by the following inequation:

$$(T-MRg)/Jm \leq a \leq (T-MRg\cdot|\sin\theta_S|)/Jm \text{ (where } |\theta_E-90°| \leq |\theta_S-90°|\text{), or,}$$

$$(T-MRg)/Jm \leq a \leq (T-MRg\cdot|\sin\theta_E|)/Jm \text{ (where } |\theta_S-90°| < |\theta_E-90°|\text{).}$$

A specified maximum acceleration $a_{max}$ at the time of deceleration is a minimum value in the range of the accelerations a like the above-mentioned specified maximum acceleration $a_{max}$ at the time of acceleration, and is $$a_{max}=(T-MRg)/Jm.$$

(7) The condition: $-90° \leq \theta_S \leq 0° \leq \theta_E \leq 90°$ and $\theta_S < \theta_E$ In this angular range, the range in which the load torque could take is expressed by the following inequation:

$$-MRg\cdot|\sin\theta_E| \leq Q \leq MRg\cdot|\sin\theta_S|.$$

The direction of action of the load torque Q changes with the angular position of 0° as a boundary. In the above inequation, the load torque Q of a negative value means that the action is in the opposite direction. In this angular range, the load torque Q at the time when the oscillating table 13 is accelerating changes from the direction of assisting the acceleration into the direction of hindering the acceleration. Therefore, the range of the accelerations a corresponding to the range of the load torques Q is expressed by the following inequation:

$$(T-MRg\cdot|\sin\theta_E|)/Jm \leq a \leq (T+MRg\cdot|\sin\theta_S|)/Jm.$$

In this embodiment, a minimum value in the range of the accelerations a is set as a specified maximum acceleration and, hence, a specified maximum acceleration $a_{max}$ at the time of acceleration is $$a_{max}=(T-MRg\cdot|\sin\theta_E|)/Jm.$$

The angular position $\theta_E$ at the end of acceleration is calculated according to the following relation that is satisfied when the oscillating table accelerates with the specified maximum acceleration $a_{max}$ up to the command velocity V:

$$V=((T-MRg\cdot|\sin\theta_E|)/Jm)\times(\theta_E-\theta_S).$$

$\theta_E$ is calculated by substituting, for example, for $\theta_E$ values that gradually increase from $\theta_S$ until the equation is satisfied.

In this angular range, if the oscillating table 13 is decelerating, then the load torque Q changes from the direction in which it hinders the deceleration into the direction in which it assists the deceleration. Therefore, the range of the accelerations a corresponding to the range of the load torques Q is expressed by the following inequation:

$$(T-MRg\cdot|\sin\theta_S|)/Jm \leq a \leq (T+MRg\cdot|\sin\theta_E|)/Jm.$$

A specified maximum acceleration $a_{max}$ at the time of deceleration is a minimum value in the range of the accelerations a like the above-mentioned specified maximum acceleration $a_{max}$ at the time of acceleration, and is $$a_{max}=(T-MRg\cdot|\sin\theta_S|)/Jm.$$

The angular position $\theta_S$ at the start of deceleration is calculated according to the following relation that is satisfied when the oscillating table decelerates with the specified maximum acceleration $a_{max}$ from the command velocity V to velocity of zero:

$$V=((T-MRg\cdot|\sin\theta_S|)/Jm)\times(\theta_E-\theta_S).$$

$\theta_S$ is calculated by substituting, for example, for $\theta_S$ values that gradually decrease from $\theta_E$ until the equation is satisfied.

(8) The condition: $-90° \leq \theta_S \leq 0°$ and $90° \leq \theta_E \leq 180°$ In this angular range, the range in which the load torque could take is expressed by the following inequation:

$$-MRg \leq Q \leq MRg \cdot |\sin \theta_S|.$$

The direction of action of the load torque Q changes with the angular position of 0° as a boundary. In the above inequation, the load torque Q of a negative value means that the action is in the opposite direction. In this angular range, if the oscillating table 13 is accelerating, then the load torque Q changes from the direction in which it assists the acceleration into the direction in which it hinders the acceleration. Therefore, the range of the accelerations a corresponding to the range of the load torques Q is expressed by the following inequation:

$$(T-MRg)/Jm \leq a \leq (T+MRg \cdot |\sin \theta_S|)/Jm.$$

In this embodiment, a minimum value in the range of the accelerations a is set as a specified maximum acceleration and, hence, a specified maximum acceleration $a_{max}$ at the time of acceleration is $$a_{max} = (T-MRg)/Jm.$$

In this angular range, if the oscillating table 13 is decelerating, then the load torque Q changes from the direction in which it hinders the deceleration into the direction in which it assists the deceleration. Therefore, the range of the accelerations a corresponding to the range of the load torques Q is expressed by the following inequation:

$$(T-MRg \cdot |\sin \theta_S|)/Jm \leq a \leq (T+MRg)/Jm.$$

A specified maximum acceleration $a_{max}$ at the time of deceleration is a minimum value in the range of the accelerations a like the above-mentioned specified maximum acceleration $a_{max}$ at the time of acceleration, and is $$a_{max} = (T-MRg \cdot |\sin \theta_S|)/Jm.$$

The angular position $\theta_S$ at the start of deceleration is calculated according to the following relation that is satisfied when the oscillating table decelerates with the specified maximum acceleration $a_{max}$ from the command velocity V to velocity of zero:

$$V = ((T-MRg \cdot |\sin \theta_S|)/Jm) \times (\theta_E - \theta_S).$$

$\theta$ is calculated by substituting, for example, for $\theta_S$ values that gradually decrease from $\theta_E$ until the equation is satisfied.

(9) The condition: $-180° \leq \theta_S \leq -90°$ and $0° \leq \theta_E \leq 90°$ In this angular range, the range in which the load torque could take is expressed by the following inequation:

$$-MRg \cdot |\sin \theta_E| \leq Q \leq MRg.$$

The direction of action of the load torque Q changes with the angular position of 0° as a boundary. In the above inequation, the load torque Q of a negative value means that the action is in the opposite direction. In this angular range, if the oscillating table 13 is accelerating, then the load torque Q changes from the direction in which it assists the acceleration into the direction in which it hinders the acceleration. Therefore, the range of the accelerations a corresponding to the range of the load torques Q is expressed by the following inequation:

$$(T-MRg \cdot |\sin \theta_E|)/Jm \leq a \leq (T+MRg)/Jm.$$

In this embodiment, a minimum value in the range of the accelerations a is set as a specified maximum acceleration and, hence, a specified maximum acceleration $a_{max}$ at the time of acceleration is $$a_{max} = (T-MRg \cdot |\sin \theta_E|)/Jm.$$

The angular position $\theta_E$ at the end of acceleration is calculated according to the following relation that is satisfied when the oscillating table 13 accelerates with the specified maximum acceleration $a_{max}$ up to the command velocity V:

$$V = ((T-MRg \cdot |\sin \theta_E|)/Jm) \times (\theta_E - \theta_S).$$

$\theta_E$ is calculated by substituting, for example, for $\theta_E$ values that gradually increase from $\theta_S$ until the equation is satisfied.

In this angular range, if the oscillating table 13 is decelerating, the load torque Q changes from the direction in which it hinders the deceleration into the direction in which it assists the deceleration. Therefore, the range of the accelerations a corresponding to the range of the load torques Q is expressed by the following inequation:

$$(T-MRg)/Jm \leq a \leq (T+MRg \cdot |\sin \theta_E|)/Jm.$$

A specified maximum acceleration $a_{max}$ at the time of deceleration is a minimum value in the range of the accelerations a like the above-mentioned specified maximum acceleration $a_{max}$ at the time of acceleration, and is, $$a_{max} = (T-MRg)/Jm$$

(10) The condition: $-180° \leq \theta_S \leq -90°$ and $90° \leq \theta_E \leq 180°$ In this angular range, the range in which the load torque could take is expressed by the following inequation:

$$-MRg \leq Q \leq MRg.$$

The direction of action of the load torque Q changes with the angular position of 0° as a boundary. In the above inequation, the load torque Q of a negative value means that the action is in the opposite direction. In this angular range, if the oscillating table 13 is accelerating, then the load torque Q changes from the direction in which it assists the acceleration into the direction in which it hinders the acceleration. Therefore, the range of the accelerations a corresponding to the range of the load torques Q is expressed by the following inequation:

$$(T-MRg)/Jm \leq a \leq (T+MRg)/Jm.$$

In this embodiment, a minimum value in the range of the accelerations a is set as a specified maximum acceleration and, hence, a specified maximum acceleration $a_{max}$ at the time of acceleration is $$a_{max} = (T-MRg)/Jm.$$

In this angular range, further, if the oscillating table 13 is decelerating, then the load torque Q changes from the direction in which it hinders the deceleration into the direction in which it assists the deceleration. Therefore, the range of the accelerations a corresponding to the range of the load torques Q is expressed by the following inequation:

$$(T-MRg)/Jm \leq a \leq (T+MRg)/Jm.$$

A specified maximum acceleration $a_{max}$ at the time of deceleration is a minimum value in the range of the accelerations a like the above-mentioned specified maximum acceleration $a_{max}$ at the time of acceleration, and is $$a_{max} = (T-MRg)/Jm.$$

The specified maximum accelerations calculated in the angular ranges of (1) to (10) as described above are used for the calculation of command accelerations by the control unit 20. Specifically, the control unit 20 controls the command acceleration such that the command acceleration becomes equal to or less than the specified maximum acceleration. Since the angular position $\theta_E$ at the end of acceleration and the angular position $\theta_S$ at the start of deceleration depend upon the command acceleration, they cannot be predetermined. Therefore, the control unit 22 estimates, based on a drive command that is input thereto, that which conditions (1) to (10) should be suitable for an angular range necessary for acceleration or deceleration. The control unit 22 further approximately calculates the angular range from O to $\theta_E$ and the range of the load torques Q according to the estimated condition. The control unit 22 determines whether the angular range from $\theta_S$ to $\theta_E$ obtained as a result of the approximate calculation matches with the estimated condition. If the result of the approximate calculation matches with the estimated condition, the control unit 22 confirms the approximately calculated angular range from $\theta_S$ to $\theta_E$ and the range of the load torques Q. If the result of the approximate calculation does not match with the estimated condition, the condition is changed and the calculation process is then conducted again until they match with each other.

Figure 10:
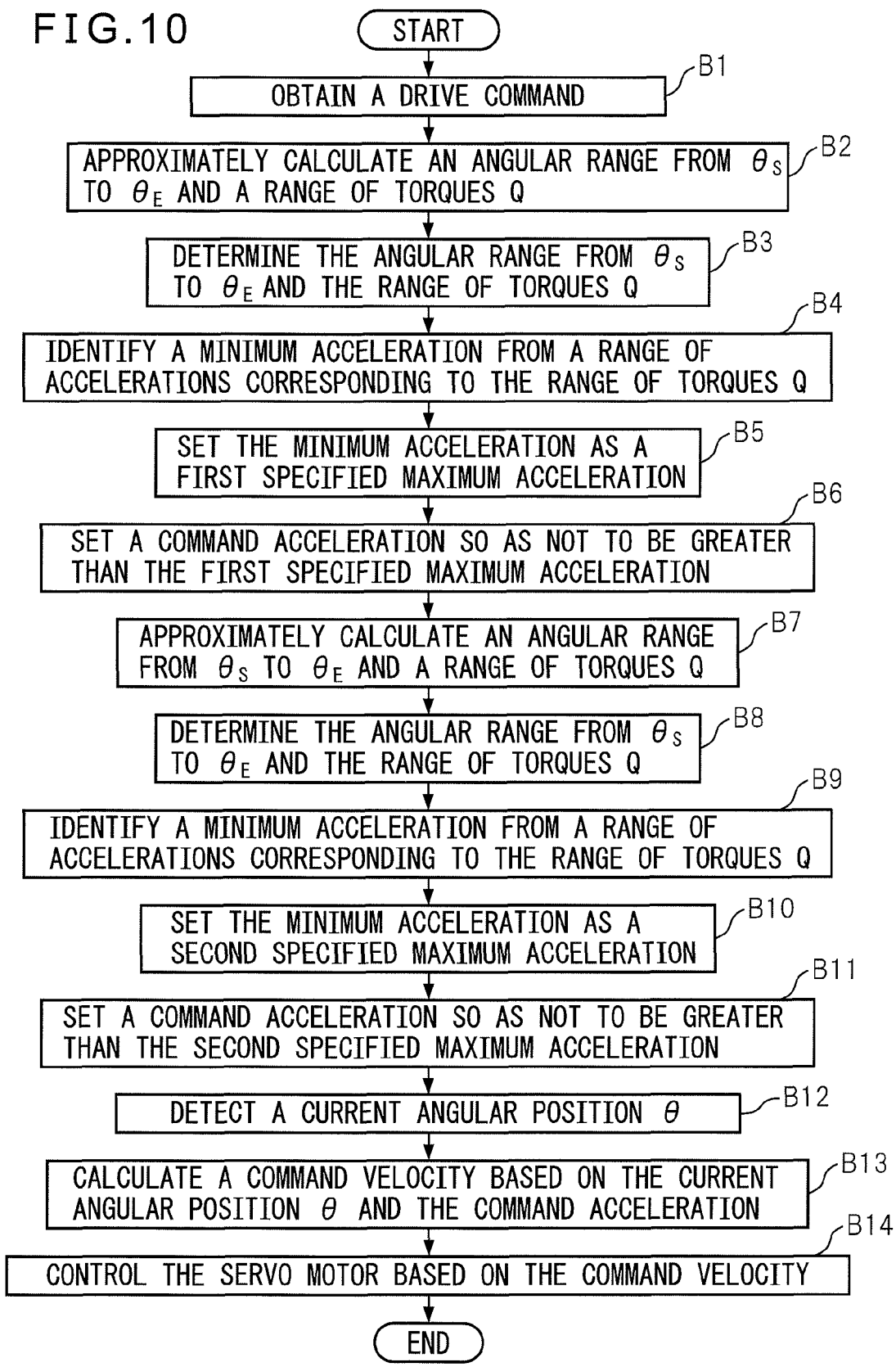
FIG. 10 is a flowchart illustrating a flow of processing in the control unit according to a second embodiment of the invention.

Further described below with reference to FIG. 10 is a control processing for calculating the specified maximum acceleration according to this embodiment. FIG. 10 is a flowchart illustrating a flow of processing in the control unit 22 according to a second embodiment of the invention.

First, the control unit 22 obtains a drive command from the command producing unit 21 (step B1). The drive command includes an amount of displacement (defined as an angular range from angle $\theta_1$ to angle $\theta_2$ (see FIGS. 6 and 9)), for example, of the oscillating table 13 about the axis X1 of rotation, and a velocity V of the oscillating table 13 about the axis X1 of rotation. As a command for indicating the amount of displacement of the oscillating table 13, it may be provided with an amount of displacement from an angular position $\theta_S$ at the start of command, or with both an angle at the start of command and an angle at the end of command.

Next, based on the current angular position $\theta$ and the amount of displacement (i.e., an amount of changes in angular positions) of the oscillating table 13, the control unit 22 approximately calculates an angular range from $\theta_S$ to $\theta_E$ necessary for the acceleration up to the preset command velocity V and a range of the load torques Q corresponding to the angular range from $\theta$ to $\theta_E$ (step B2). The angular range from $\theta$ to $\theta_E$ can be calculated through the relation of the command velocity V and the angular position $\theta_E$ at the end of acceleration in accordance with the calculation process corresponding to any one of the above-mentioned conditions (1) to (10). The control unit 22 then determines the angular range from $\theta$ to $\theta_E$ and the range of the load torques Q corresponding to the angular range from $\theta$ to $\theta_E$ (step B3). The process at step B3 is conducted by repeating the calculation until the result of the approximate calculation at step B2 matches with the condition selected for the approximate calculation from the conditions (1) to (10). The control unit 22 determines a range of accelerations corresponding to the range of the torques Q, and identifies a minimum acceleration in the range (step B4).

As described above, the acceleration corresponding to the load torque Q is calculated according to the formula which switches, depending on whether the load torque Q assists or hinders the acceleration of the servo motor 15, based on the angular range from $\theta_S$ to $\theta_E$ necessary for the acceleration up to the command velocity V. More specifically, if the load torque Q is acting in the direction in which it hinders the acceleration of the servo motor 15, a value is calculated as a specified maximum acceleration, by subtracting the load torque Q from the output torque T of the servo motor 15 and further by dividing a resultant of the subtraction by the inertia Jm about the axis X1 of rotation. Further, if the load torque Q is acting in the direction in which it assists the acceleration of the servo motor 15, a value is calculated as a specified maximum acceleration, by adding the load torque Q to the output torque T of the servo motor 15 and further by dividing a resultant of the addition by the inertia Jm about the axis X1 of rotation.

Returning to FIG. 10, the control unit 22 at step B5 sets the minimum acceleration identified at step B4 as a first specified maximum acceleration. The control unit 22 controls the command acceleration so as not to be greater than the first specified maximum acceleration (step B6).

Next, the control unit 22 approximately calculates an angular range from $\theta_S$ to $\theta_E$ necessary for the deceleration from the command velocity V to velocity of zero (i.e., at the end of command), and a range of the load torque Qs corresponding to the angular range from $\theta_S$ to $\theta_E$ (step B7). The angular range from $\theta_S$ to $\theta_E$ can be obtained from the above-mentioned relation between the above command velocity V and the angular position $\theta_S$ at the start of deceleration in accordance with the calculation process corresponding to any one of the above-mentioned conditions (1) to (10). The control unit 22 then determines the angular range from $\theta_S$ to $\theta_E$ and the range of the load torques Q corresponding to the angular range from $\theta_S$ to $\theta_E$ (step B8). Like the process at step B3, the process at step B8 is conducted by repeating the calculation until the result of the approximate calculation at step B7 matches with the condition selected for the approximate calculation from the conditions (1) to (10). The control unit 22 determines a range of accelerations corresponding to the range of the torques Q, and identifies a minimum acceleration in the range according to the above-mentioned method (step B9). Further, the control unit 22 sets the minimum acceleration identified at step B9 as a second specified maximum acceleration (step B10). The control unit 22 controls the command acceleration so as not to be greater than the second specified maximum acceleration (step B11).

Next, at step B12, the control unit 22 obtains a current angular position $\theta$ of the oscillating table 13 from the output of the angle detector. The control unit 22 calculates a command velocity, based on the current angular position $\theta$ and the command velocity (step B13). The control unit 22 controls the servo motor 15, based on the command velocity.

Figure 8A:
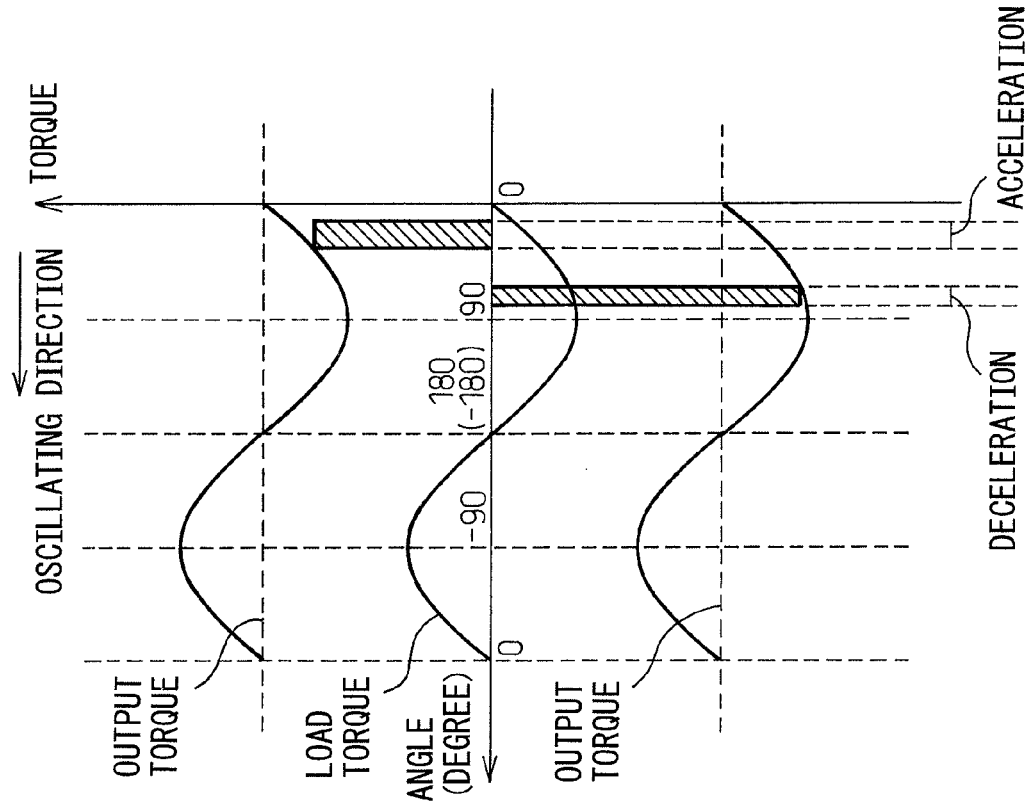
FIG. 8A is a graph illustrating a relationship between the load torque and the angular position of the oscillating table according to a prior art.
Figure 8B:
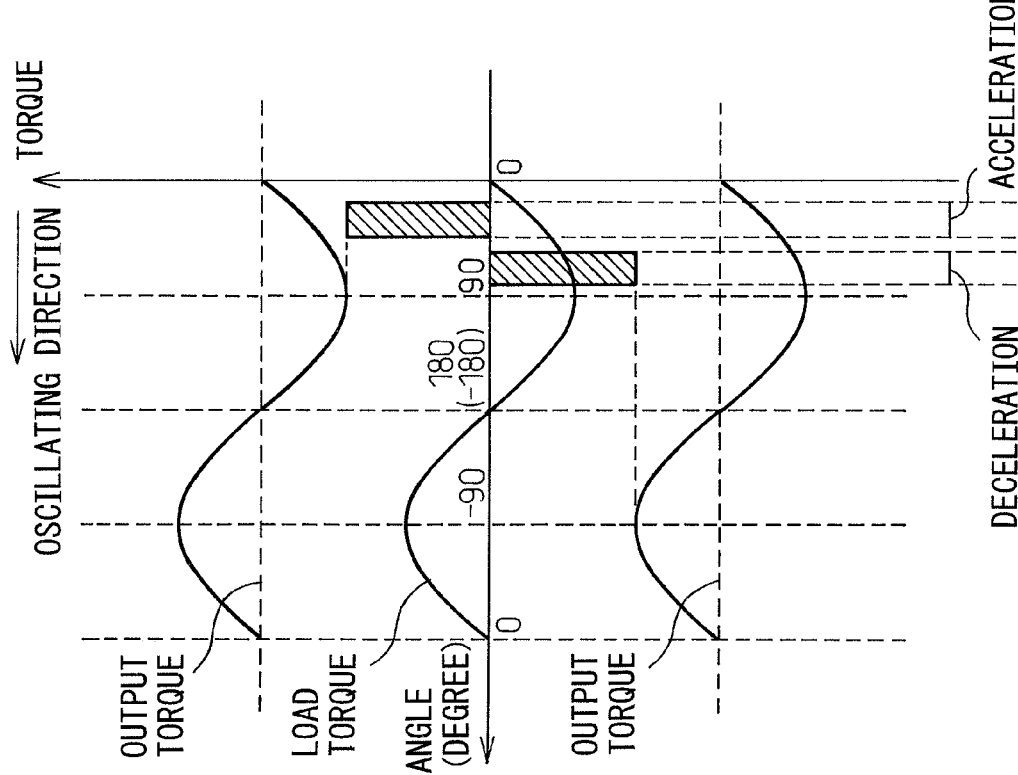
FIG. 8B is a graph illustrating a relationship between the load torque and the angular position of the oscillating table according to the present invention.

FIG. 8A is a graph illustrating a relationship between the load torque Q and the angular position of the oscillating table 13 according to a prior art, and FIG. 8B is a graph illustrating a relationship between the load torque Q and the angular position of the oscillating table 13 according to the embodiment of the invention. According to the prior art, as clearly seen from FIG. 8A, a value is calculated as a specified maximum acceleration, by subtracting a maximum load torque that is acting in the direction to hinder the acceleration or deceleration, from the output torque T of the servo motor 15 and further by dividing a resultant of the subtraction by the inertia Jm. Therefore, the acceleration is limited even at an angular position where a greater torque of the servo motor 15 can be utilized. In the graph, the areas of the hatched sections represent the angular velocities V.

Referring to FIG. 8B, on the other hand, the present invention is free from the limitation in the prior art and therefore, a greater torque can be effectively utilized for oscillating the oscillating table 13 at an angular position where a greater torque of the servo motor 15 is available. Similarly as mentioned above, the areas of the hatched sections represent the angular velocities V. In this particular example, as clearly seen from FIG. 8B, the angular ranges of the oscillating table 13 during acceleration or deceleration are relatively narrower, as compared to those of the prior art. This means that the time required for accelerating or decelerating the oscillating table 13 is shortened. Therefore, it is understood that the time necessary for oscillating the oscillating table 13 can be shortened.

Next, a third embodiment of the present invention will be explained. In the machine tool 11 according to the third embodiment, an acceleration is calculated by the control unit 22 as a first specified maximum acceleration, i.e., as a specified maximum acceleration at the time of acceleration, based on a load torque Q corresponding to an angular position $\theta_{S1}$ at the start of acceleration, and an acceleration is calculated by the control unit 22 as a second specified maximum acceleration, i.e., as a specified maximum acceleration at the time of deceleration, based on a load torque Q corresponding to an angular position $\theta_{E2}$ at the end of deceleration. The calculating process of the acceleration based on the load torque Q is the same as the process mentioned above. That is, if the load torque Q acts in a direction in which it hinders the acceleration or deceleration of the servo motor 15, an acceleration is calculated by subtracting the load torque Q from the output torque T of the servo motor 15 and further dividing a resultant of the subtraction by inertia Jm about the axis X1 of rotation. If the load torque Q acts in a direction in which it assists the acceleration or deceleration of the servo motor 15, an acceleration is calculated by adding the load torque Q to the output torque T of the servo motor 15 and further dividing a resultant of the addition by the inertia Jm about the axis X1 of rotation.

This embodiment is based on the assumption that the load torque Q does not significantly vary from the start to the end of acceleration or deceleration. Namely, as compared to the second embodiment described above, this embodiment omits the step of calculating the range in which the load torque Q could take from the start to the end of acceleration or deceleration. The angular position $\theta_{S1}$ at the start of acceleration, i.e., at the start of command and the angular position $\theta_{E2}$ at the end of deceleration, i.e., at the end of command, can be imparted by the command producing unit 21. Therefore, in this embodiment a specified maximum acceleration necessary for producing a command velocity can be quickly calculated.

Figure 11:
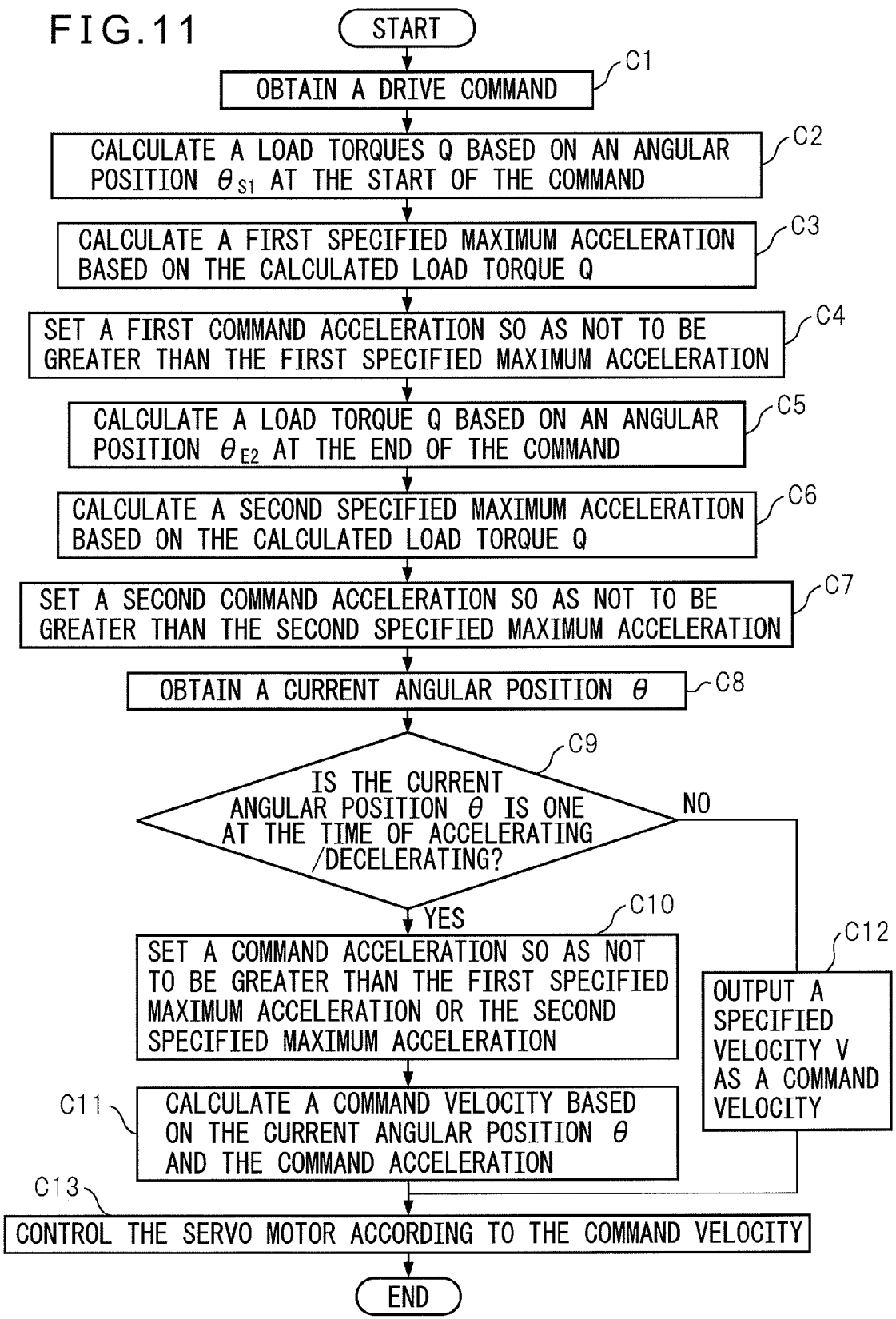
FIG. 11 is a flowchart illustrating a flow of processing in the control unit according to a third embodiment of the invention.

Further described below with reference to FIG. 11 is a control processing for calculating the specified maximum acceleration according to this embodiment. FIG. 11 is a flowchart illustrating a flow of processing in the control unit 22 according to the third embodiment of the invention.

First, the control unit 22 obtains a drive command from the command producing unit 21 (step C1). The drive command includes an amount of displacement (defined as an angular range, for example, from angle $\theta_1$ to angle $\theta_2$ (see FIGS. 6 and 9)) of the oscillating table 13 about the axis X1 of rotation and a velocity V of the oscillating table 13 about the axis X1 of rotation. As a command for indicating the amount of displacement of the oscillating table 13, it may be provided with an amount of displacement from the angular position $\theta_{S1}$ at the start of command, or with both an angle $\theta_{S1}$ at the start of command and an angle $\theta_{E2}$ at the end of command.

Next, based on the angular position $\theta_{E1}$ corresponding to the start of command, the control unit 22 calculates a load torque Q (step C2). The control unit 22 calculates a first specified maximum acceleration based on the calculated load torque Q (step C3). The calculating process of the first specified maximum acceleration is the same as the process mentioned above. The control unit 22 sets a first command acceleration so as not to be greater than the first specified maximum acceleration calculated at step C3 (step C4). The first command acceleration is used for accelerating the oscillating table 13 during the oscillation of the oscillating table 13.

Next, the control unit 22 calculates a load torque Q based on the angular position $\theta_{E2}$ corresponding to the end of command (step C5). The control unit 22 calculates a second specified maximum acceleration based on the calculated load torque Q (step C6). The calculating process of the second specified maximum acceleration is the same as the process mentioned above. The control unit 22 sets a second command acceleration so as not to be greater than the second specified maximum acceleration calculated at step C6 (step C7). The second command acceleration is used for decelerating the oscillating table 13 during the oscillation of the oscillating table 13.

The control unit 22 then obtains a current angular position θ from the angle detector (step C8). The control unit 22 determines whether or not the current angular position is an angular position at the time of accelerating or decelerating (step C9). Namely, at step C9, it is determined whether the oscillating table 13 is currently accelerating or decelerating, or moving at a constant command velocity V.

At step C9, if it is determined that the current angular position corresponds to that at the time of accelerating or decelerating, the control unit 22 at step C10 sets a command acceleration so as not to be greater than the first specified maximum acceleration if the oscillating table is accelerating, or sets a command acceleration so as not to be greater than the second specified maximum acceleration if the oscillating table is decelerating. The control unit 22 then calculates a command velocity based on the current angular position and the command acceleration (step C11). On the other hand, if the control unit 22 at step C9 determines that the current angular position corresponds to that at the time of accelerating or decelerating, a specified velocity V is then output as a command velocity (step C12). The control unit 22 controls the servo motor 15 according to the command velocity obtained at step C11 or C12 (step C13).

In the above embodiments, if the load torque Q is acting on the servo motor 15 in a direction in which it assists the acceleration or deceleration, the oscillating table 13 can be accelerated or decelerated with an acceleration greater than an acceleration a (=T/Jm) provided by only the output torque T of the servo motor 15. When the angular range of oscillation of the oscillating table 13 is small, however, the acceleration could be so great that the oscillating table 13 sometimes cannot be decelerated to a predetermined angular position at the end of deceleration. In order to avoid this problem, it may be desirable to set a specified maximum acceleration such that an acceleration a is not greater than that corresponding to the output torque T of the servo motor 15 when there is no effect of gravity, i.e., when it is presumed that the load torque Q is zero. As a result, the specified maximum acceleration is set so as not to greater than a value obtained by dividing the output torque T of the servo motor 15 by the inertia Jm.

In the above-mentioned embodiments, although the control unit 22 of the invention is applied to the machining center, it should be noted that the present invention can also be applied to other machine tools having an oscillating body. Namely, the present invention is not limited to only the embodiments described above with reference to the drawings so far as the features and functions of the invention can be realized.

EFFECTS OF THE INVENTION

According to the oscillation controller for an oscillating body of the present invention, the acceleration of the oscillating body can be adjusted when the oscillating body is oscillating.

Although the invention has been shown and described with exemplary embodiments thereof, it should be understood by those skilled in the art that the foregoing and various other changes, omissions and additions may be made therein and thereto without departing from the spirit and the scope of the invention.

The invention claimed is:

1. An oscillation controller for an oscillating body, for setting an acceleration of said oscillating body when the oscillating body is oscillated by a drive motor about an axis of rotation that extends in a horizontal direction, wherein
   a load torque due to gravity acting on the drive motor is obtained at at least one angular position defined about said axis of rotation,
   if said load torque acts in a direction in which it hinders acceleration or deceleration of said drive motor, a specified maximum acceleration is calculated by subtracting said load torque from an output torque of said drive motor and further dividing a resultant value of the subtraction by inertia about said axis of rotation, said load torque being a maximum load torque within a range of angles at which the oscillating body is accelerated or decelerated,
   if said load torque acts in a direction in which it assists acceleration or deceleration of said drive motor, a specified maximum acceleration is calculated by adding said load torque to an output torque of said drive motor and further dividing a resultant value of the addition by the inertia about said axis of rotation, said load torque being a minimum load torque within a range of angles at which the oscillating body is accelerated or decelerated, and
   an acceleration for the oscillating body at the time of accelerating or decelerating is set so as not to be greater than the calculated specified maximum acceleration.

2. An oscillation controller for an oscillating body, for setting an acceleration of said oscillating body when the oscillating body is oscillated by a drive motor about an axis of rotation that extends in a horizontal direction, wherein
   if said oscillating body is accelerating, a load torque due to gravity acting on the drive motor is obtained at an angular position about said axis of rotation at the start of acceleration of said oscillating body, and
   if said oscillating body is decelerating, a load torque due to gravity acting on the drive motor is obtained at an angular position about said axis of rotation at the end of deceleration of said oscillating body,
   if said load torque acts in a direction in which it hinders acceleration or deceleration of said drive motor, a specified maximum acceleration is calculated by subtracting said load torque from an output torque of said drive motor and further dividing a resultant value of the subtraction by inertia about said axis of rotation,
   if said load torque acts in a direction in which it assists acceleration or deceleration of said drive motor, a specified maximum acceleration is calculated by adding said load torque to an output torque of said drive motor and further dividing a resultant value of the addition by the inertia about said axis of rotation, and
   an acceleration for the oscillating body at the time of accelerating or decelerating is set so as not to be greater than the calculated specified maximum acceleration.

3. A machine tool comprising:
   an oscillating body capable of oscillating about an axis of rotation that extends in a horizontal direction;
   a drive motor for oscillating said oscillating body about said axis of rotation; and
   a control unit for setting an acceleration of said oscillating body at the time of accelerating or decelerating so as not to be greater than a specified maximum acceleration;
   wherein said control unit obtains a load torque due to gravity acting on said drive motor at at least one angular position defined about said axis of rotation,
   if said load torque acts in a direction in which it hinders acceleration or deceleration of said drive motor, the specified maximum acceleration is calculated by subtracting said load torque from an output torque of said drive motor and further dividing a resultant value of the subtraction by inertia about said axis of rotation, said load torque being a maximum load torque within a range of angles at which the oscillating body is accelerated or decelerated,
   if said load torque acts in a direction in which it assists acceleration or deceleration of said drive motor, the specified maximum acceleration is calculated by adding said load torque to an output torque of said drive motor and further dividing a resultant value of the addition by the inertia about said axis of rotation, said load torque being a minimum load torque within a range of angles at which the oscillating body is accelerated or decelerated, and
   an acceleration for the oscillating body at the time of accelerating or decelerating is set so as not to be greater than the calculated specified maximum acceleration.

4. A machine tool comprising:
   an oscillating body capable of oscillating about an axis of rotation that extends in a horizontal direction;
   a drive motor for oscillating said oscillating body about said axis of rotation; and
   a control unit for setting an acceleration of said oscillating body at the time of accelerating or decelerating so as not to be greater than a specified maximum acceleration;
   wherein said control unit obtains a load torque due to gravity acting on said drive motor at at least one angular position defined about said axis of rotation,
   if said oscillating body is accelerating, a load torque due to gravity acting on the drive motor is obtained at an angular position about said axis of rotation at the start of acceleration of said oscillating body, and
   if said oscillating body is decelerating, a load torque due to gravity acting on the drive motor is obtained at an angular position about said axis of rotation at the end of deceleration of said oscillating body,
   if said load torque acts in a direction in which it hinders acceleration or deceleration of said drive motor, a specified maximum acceleration is calculated by subtracting said load torque from an output torque of said drive motor and further dividing a resultant value of the subtraction by inertia about said axis of rotation,
   if said load torque acts in a direction in which it assists acceleration or deceleration of said drive motor, a specified maximum acceleration is calculated by adding said load torque to an output torque of said drive motor and further dividing a resultant value of the addition by the inertia about said axis of rotation, and
   an acceleration for the oscillating body at the time of accelerating or decelerating is set so as not to be greater than the calculated specified maximum acceleration.

* * * * *